(12) United States Patent
Aronstam et al.

(10) Patent No.: US 6,980,929 B2
(45) Date of Patent: Dec. 27, 2005

(54) WELL DATA COLLECTION SYSTEM AND METHOD

(75) Inventors: Peter S. Aronstam, Houston, TX (US); David E. Emerson, Sugar Land, TX (US); Strode Pennebaker, III, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 167 days.

(21) Appl. No.: 10/121,228

(22) Filed: Apr. 12, 2002

(65) Prior Publication Data

US 2002/0169645 A1 Nov. 14, 2002

Related U.S. Application Data

(60) Provisional application No. 60/284,493, filed on Apr. 18, 2001, now abandoned.

(51) Int. Cl.⁷ .......................... G01N 27/00; G06F 17/30
(52) U.S. Cl. ................ 702/188; 340/853.3; 340/853.2; 702/9; 702/12; 702/23; 705/7; 707/1
(58) Field of Search .......................... 702/6, 12, 188, 702/9, 32; 705/63; 165/45; 166/65.1; 175/45, 48; 340/853.4, 853.1, 853.3; 367/15, 73, 69; 700/28, 282; 701/215; 703/110; 709/202, 224; 710/60; 707/1

(56) References Cited

U.S. PATENT DOCUMENTS

| | | | |
|---|---|---|---|
| 4,794,534 A | * 12/1988 | Millheim ........................ 702/9 |
| 5,432,709 A | * 7/1995 | Vollweiler et al. ............ 702/32 |
| 5,933,655 A | * 8/1999 | Vrabec et al. ................. 710/60 |
| 5,963,650 A | 10/1999 | Simionescu et al. .......... 705/63 |
| 5,983,164 A | * 11/1999 | Ocondi ......................... 702/12 |
| 6,012,016 A | 1/2000 | Bilden et al. ................. 702/12 |
| 6,169,967 B1 | 1/2001 | Dahlem et al. ............... 703/10 |
| 6,236,894 B1 | 5/2001 | Stoistis et al. ................ 700/28 |
| 6,271,766 B1 | 8/2001 | Didden et al. ........... 340/853.1 |
| 6,276,438 B1 | 8/2001 | Amerman et al. ............ 165/45 |
| 6,308,787 B1 | 10/2001 | Alft ............................. 175/48 |
| 6,315,062 B1 | 11/2001 | Alft et al. ..................... 175/45 |
| 6,356,205 B1 | * 3/2002 | Salvo et al. ............. 340/853.3 |
| 6,430,547 B1 | * 8/2002 | Busche et al. ................. 707/1 |
| 6,456,902 B1 | * 9/2002 | Streetman .................. 700/282 |

FOREIGN PATENT DOCUMENTS

WO    WO 01/23705 A1    4/2001

* cited by examiner

*Primary Examiner*—Bryan Bui
*Assistant Examiner*—John Le
(74) *Attorney, Agent, or Firm*—Cantor Colburn LLP

(57) ABSTRACT

Disclosed is a system and method for directing data representing well operations (drilling and producing) through the Internet or similar wide area network. The instant invention comprises a system and method of installing sensors at the well to provide technical information to remotely-located Internet users who provide services to the well owner. The service providers may be observers, who may then advise the well owners and operators as to actions to take to increase or optimize well performance. Service providers may also be data storage companies, who clean and store the data from the well. Service providers may then be paid from a portion of the well revenues or a portion of the incrementally-increased revenues.

32 Claims, 5 Drawing Sheets

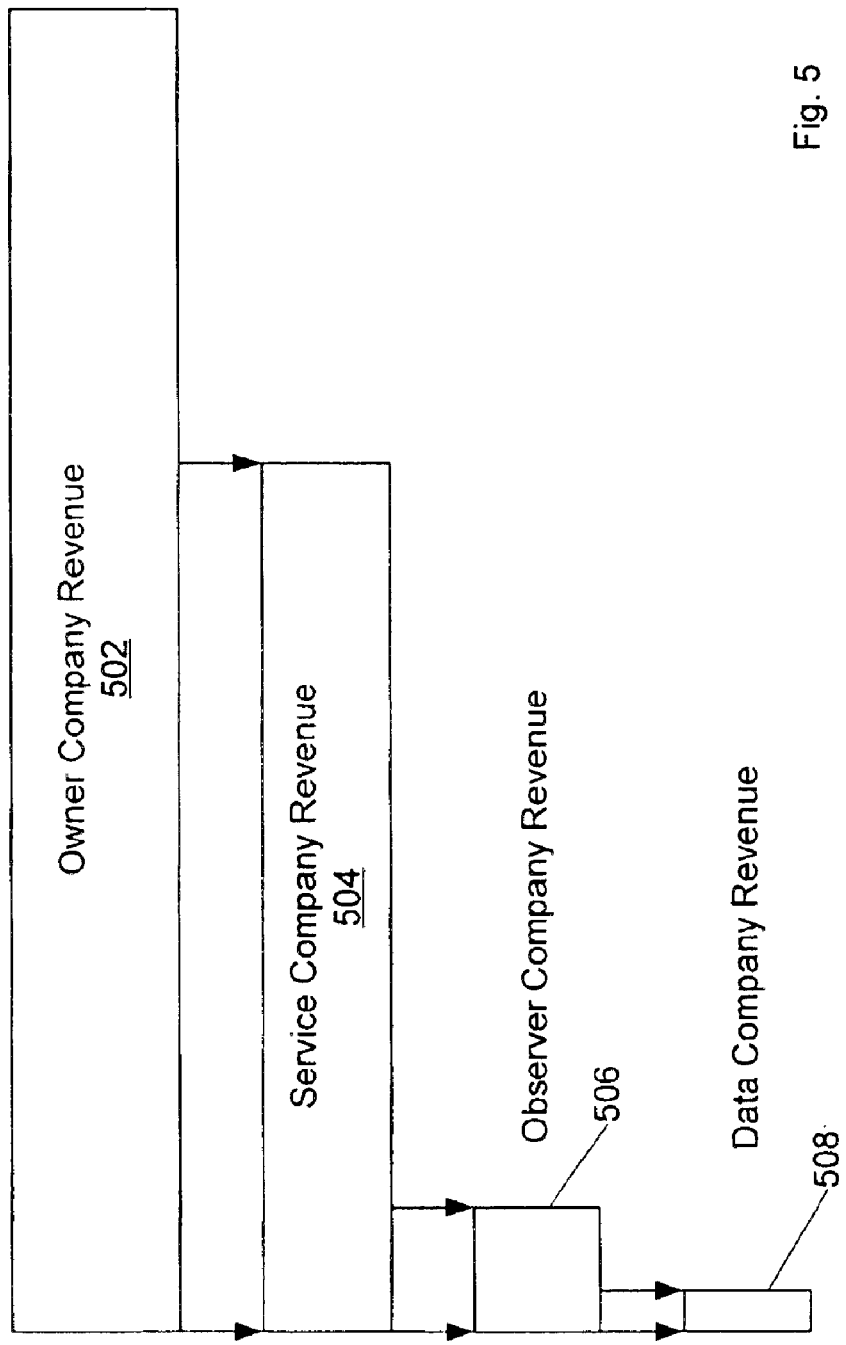

WELL DATA COLLECTION SYSTEM AND METHOD

CROSS REFERENCE TO RELATED APPLICATIONS

The present invention claims priority under 35 U.S.C. 120 to Provisional Patent Application Ser. No. 60/284,493 filed in the United States Patent and Trademark Office on Apr. 18, 2001 of which is incorporated herein by reference in its entirety.

TECHNICAL FIELD

The instant invention relates in general to a system and method for directing data regarding well operations through the Internet. More specifically, the instant invention is a system and method of having sensors at the well to provide information accessible on the Internet by remotely-located users and service providers. The users and service providers may perform tasks using the data, such as data storage, well optimization advising and other monitoring functions. A method is disclosed which facilitates the provision service models relating to the well and well data, in order to optimize overall well operations.

BACKGROUND

Computer networks have proliferated, particularly the global computer network commonly known as the Internet. This proliferation is due to a number of factors, including the increase in available communication bandwidth, the increase in computer hardware capabilities, improvements in computer software, and the reduction in costs associated with each of the foregoing. As a result, many users often have access to computer facilities and communications means, enabling those users to access many facilities remotely. In fact, these technologies have become so prevalent that it is commonplace for workers to be able to access larger data stores and other sophisticated computerized information directly from their homes.

The Internet is a global set of interconnected data processing machines and networks that operate based upon the packet-based Transmission Control Protocol/Internet Protocol ("TCP/IP"). Each data processing system, server or node, on the network has associated with it an address (an "IP address") by which it can be accessed from other data processing systems on the network. Under the IP addressing system, addresses are comprised of four numbers between the values of 0 and 255, each separated by a period, or a "dot". For example, 169.255.255.0 is a valid TCP/IP address.

Many improvements in accessibility and security have been made to the Internet. These improvements range from conveniences, such as the provision of "domain names," which provide users English equivalents for TCP/IP numeric addresses, to more advanced measures, such as Secured Length Layers ("SLLs") which provide sophisticated password-based access controls to the various notes within the network. Service facilities have also been developed so that high-level coding languages may be used to communicate with common users through a "browsing" interface.

The use of browsing technology has also become very sophisticated, to the point that many users now enter information, receive customized responses, perform complex searches and full access databases and other information over the Internet. Powerful languages such as the HyperText Markup Language ("HTML"), JavaScript, JScript, Active Server Page ("ASP") and other languages act individually or in concert with one another to provide tremendous power and flexibility to programmers. Meanwhile, users experience a more user-friendly interface system with each development.

Oilfield and well technology has, similarly, experienced technological improvements. Though some of these improvements relate to connectivity, many of them relate to monitoring and tracking, improved drilling techniques and improved makeover techniques. Currently, the driller or operator of a well has many options available on a minute-by-minute basis to change production variables and techniques to attempt to increase well productivity.

Changes in operations, particularly in the areas of data sensing and tracking techniques, have also resulted in a myriad of data sets for each well, each of which are incredibly large. In fact, the amount of data has grown far beyond most companies' ability to review and analyze it. Presently, such data is often reviewed only one time per quarter. Even then, less than twenty percent of the data is evaluated. While this data analysis represents a vast improvement over the data analysis techniques of the past (when the data was not even available), it highlights an area where more analysis may yield better well production.

Companies who drill have also undergone several corporate and business model changes. These changes include, but are not limited to, an increasing pressure and desire to outsource work, in an attempt to reduce overhead costs, which are notoriously great. Rather than using employees to fulfill every company need, consultants and contractors are being increasingly utilized to perform many job functions. Moreover, the average age of professional in the field has increased dramatically, placing more workers at retirement age. Many of these workers are opting to cease employment and begin contracting or consulting as an alternative to retirement. The many contractors and consultants, particularly with regard to well-related needs, provide drilling and operating companies additional flexibility to respond to market needs and anticipated future needs simply by hiring or releasing contractors and consultants. The company is relieved of the responsibility of handling employment issues, such as taxes, unemployment insurance, health insurance, etc.

The increase in the use of contractors and consultants has permitted a reduction in the workforces of these companies. As a direct result, however, it is no longer possible for each well to have a company representative with the proper expertise present and available at all times, even to review the work of consultants and contractors. The problem often times is much less one of time and much more one of distance. The company employees simply cannot be at two or three wells on opposite sides of the globe simultaneously.

The use of consultants and contractors suffer the same downsides. Specifically, often the contractors and consultants with the experience required at a particular location are not at the particular location. Accordingly, companies are forced to pay transportation costs associated with relocating the contractor or consultant, either on a temporary or permanent basis, to a locale in closer proximity to where services are needed. Even so again, it is impossible for these consultants to work on multiple wells when they are remotely located from each other.

Accordingly, what is needed is a system and method for the provision of drilling and production wellhead information to qualified personnel who are remotely located, so that those personnel may use such data to enhance well drilling and production functions. Such a system must be sufficiently flexible to permit the viewing of a range of variables and must be globally available.

SUMMARY

The present invention addresses the foregoing needs by providing a system and method for accessing drilling and production information over networking systems, such as the Internet. The invention may take advantage of browsing technology in order to create a new paradigm of data manipulation and use that can be operated efficiently by any number of users throughout the world for any given drilling or production operation. While the invention is well-suited to the Internet context, those skilled in the art will appreciate that its application may be extended to any wide area network ("WAN"), as well as any successors to the Internet.

The invention comprises a well. It will be appreciated that the well may be in a drilling or a production mode or any other mode during which monitored information may be used to determine different interventions to be accomplished on the well. The well has associated with it an IP address. The well further comprises a set of sensors, which are situated so as to provide information regarding the wellbore. The well also comprises communication facilities to connect the well to the Internet or other WAN.

The invention further comprises a service provider data processing system, which is also connected to the Internet or WAN via a communication link. One or more service provider data processing systems may be employed, so that multiple independent individuals and/or groups providing well and data services may access the system simultaneously.

The well is configured so that the sensors provide information regarding well performance over the Internet or WAN to the service provider data processing system. Service providers may use the data directly to provide a benefit, or may use the data stored by other service providers in order to provide a benefit. For example, well production observers may use the service provider data processing system to view the data and manipulate or analyze it in order to recommend various interventions to the owner of the well.

In one embodiment of the invention, services of the service providers may be offered on a speculative basis to the well owners. Service providers are reimbursed if and only if the information or service they provide to the well owner is subsequently used. In an alternative embodiment, such reimbursement may be tied to the performance improvement at the well. In yet another embodiment, service providers are paid a retainer, which is supplemented with either of the preceding speculative models. These embodiments may provide for payment to the service providers directly or from other service providers, forming a chain of revenue distribution.

The foregoing outlines broadly the features and technical advantages of the present invention so that the detailed description of the invention that follows may be better understood. Additional features, advantages and preferred embodiments of the invention will be described hereafter which form the subject of the claims of the invention.

BRIEF DESCRIPTION OF THE DRAWINGS

For a more complete understanding of the present invention, and the advantages thereof, reference is now made to the following descriptions, taken in conjunction with the accompanying drawings, in which:

FIG. 5 is a block diagram depicting the distribution of revenues under an embodiment of the instant invention.

DETAILED DESCRIPTION

Figure 1:
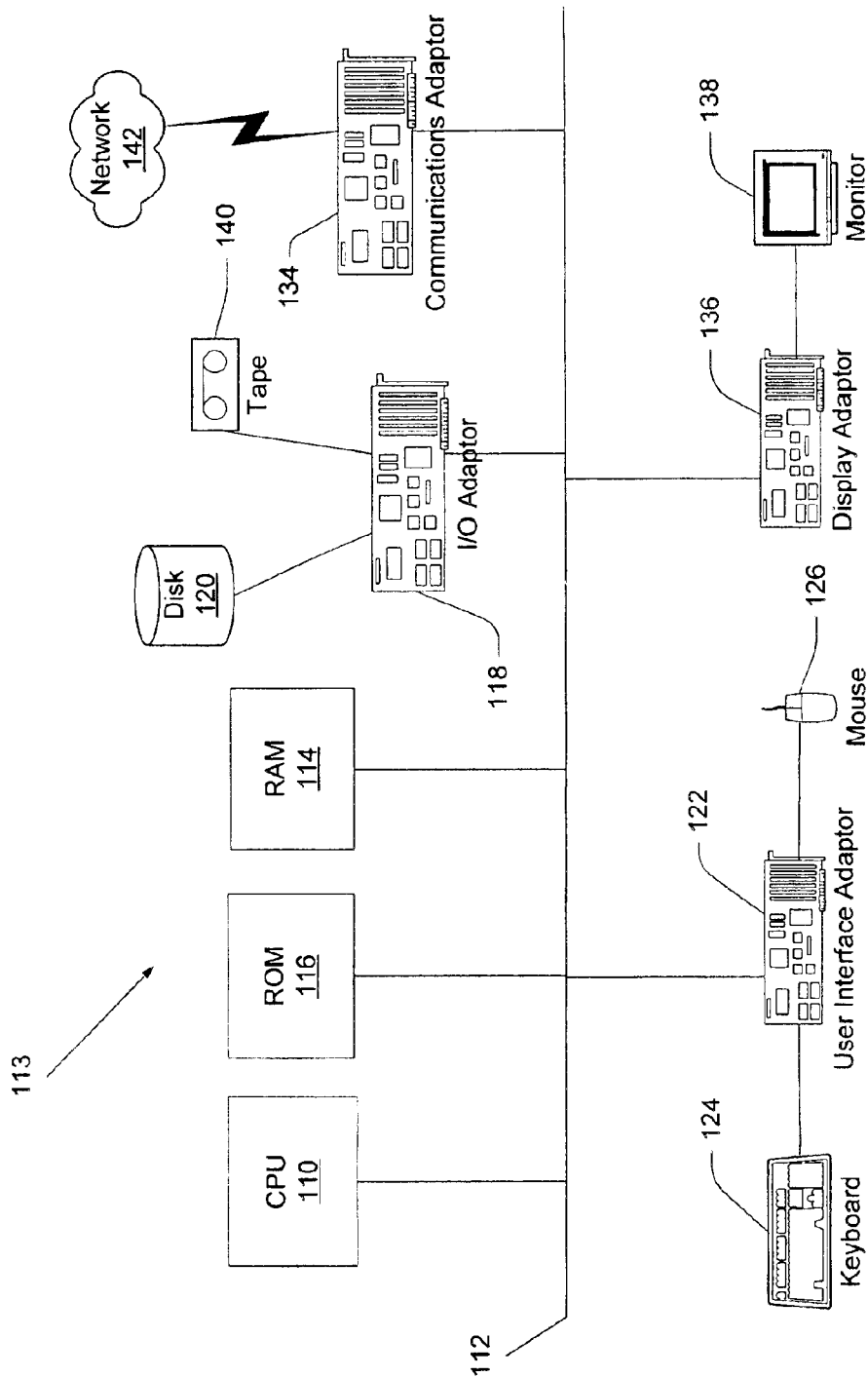
FIG. 1 is a system diagram of a data processing system, including hardware and firmware, which may be used to implement the instant invention.

In the following description, numerous specific details are set forth, such as computer applications, programming languages, user interface systems, database structures and implementations, operating systems, network systems, communications systems, protocols, input output ("I/O") systems, drilling systems, and wellhead configurations, etc., to provide a thorough understanding of the invention to the reader. However, it will be obvious to those skilled in the art that the present invention may be practiced without such specific details and, in fact, that those embodiments described herein may be modified in many details, all falling within the teaching of this disclosure and the appended claims. In other instances, well-known applications, network systems, wellhead configurations, sensor systems, communications systems, data formats, protocols, and computer equipment have been shown in block diagram form in order to not obscure the present invention in unnecessary detail. For the most part, details concerning timing considerations, specific applications used, specific languages used, specific network or communication systems used, specific drilling or production systems used, specific data formats used, and the like have been omitted inasmuch as these details are not necessary to obtain a complete understanding of the present invention. Moreover, these details are deemed well within the skills of persons of ordinary skill in the art.

It should be understood that, in the context of this disclosure, a "server" or a "server machine" is a reference to a data processing system on a network system which runs a server program, which provides services to other data processing systems, such as access to data, communications routing, etc. In fact, the data processing system that acts as a server may also run other programs, including programs that interact with and use the services offered by the server program within the network system. Likewise, a "client" or "node" is a data processing system on a network system which runs a client program and may run other programs, including a server program. Accordingly, it is possible, although those skilled in the art will appreciate that it may not be practical in many instances, for a single data processing system to act as the server and the client simultaneously.

Those skilled in the art will also appreciate that, throughout this specification, the terms "data processing system," "machine" and "computer" are used interchangeably, each having the meaning of a data processing system in the broadest sense and description.

The term "data" used within the specification is intended to encompass any collection of information regarding a drilling or production operation. Accordingly, it is observed that "data" may be information and measurements relating to flow, pressure, temperature, acoustics, saturation, porosity, vibration, resistivity, radiation, and/or the presence of various environmental factors (such as solids, liquids or gases in or in proximity to the well, either in the formation or on the surface), and the like. Moreover, the term "data" does not imply a particular format to the data, but is intended to encompass all types and forms of data formatting, analog and digital, and including those that may be used within a data processing system. Those skilled in the art will also appreciate that the concepts taught in this specification and covered within the scope of the claims that follow are universal and will readily apply to sensor systems and data formats developed in the future. It will further be appreciated that the data referenced may be stored in any number of ways, including but not limited to, hard copy, free-standing electronic databases, computer databases which are a part of other applications, and other alternate memory or recording models. Accordingly, many of the popular applications in the art which make use of databases (such as spreadsheet programs, word processing programs, accounting programs, database programs, geologic information programs, and the like) may be utilized in conjunction with the instant invention.

The term "well" used within the specification in its most general sense of a hole drilled or bored into the earth, without specific reference to the product intended to be produced from the well. Accordingly, a "well" could be intended to produce water, petroleum, natural gas, brine, sulfur or any other number of compounds. A "well" as used herein specifically encompasses such a hole or bore during all phases of its life, including without limitation, drilling, production, revitalization, plugging and abandoning. Those skilled in the art will appreciate that the method or device by which the hole or bore is generated is not relevant to the invention disclosed, and all methods or devices of generation are implied by the use of the term "well."

The term "service provider" is used throughout the specification in its broad sense as any entity (person, company or the like) which provides services relating to a well. Those skilled in the art will appreciate that a "service provider" may perform tasks using data relating to the well, such as data storage, well optimization advising and other monitoring functions. Equally, a "service provider" may perform tasks directly on a well, such as fracturing, plugging and abandoning, providing and/or installing Christmas trees and other equipment, providing and/or applying muds or other chemicals or solutions to the well, and similar tasks. A "service provider" may also provide the service of recommending the application of a certain product or method to a well.

A representative hardware environment for practicing the instant invention and its components is depicted with reference to FIG. 1, which illustrates a hardware configuration of a data processing system 113 in accordance with the subject invention. The data processing system 113 includes a central processing unit ("CPU") 110, such as a conventional microprocessor, and a number of other units interconnected via a system bus 112. The CPU 110 may include other circuitry not shown herein, which will include circuitry found within a microprocessor, e.g. execution unit, bus interface unit, Arithmetic Logic Unit ("ALU"), etc. The CPU 110 may also reside on a single Integrated Circuit ("IC") chip.

The data processing system 113 includes a Random Access Memory ("RAM") 114 and a Read Only Memory ("ROM") 116. Also included are an I/O adapter 118 for connecting peripheral devices such as disk units 120 and tape drives 140 to the bus 112, a user interface adapter 122 for connecting a keyboard 124, a mouse 126 and/or other user interface devices, such as a touch screen device (not shown) to the bus 112. The I/O adapter 118 may be of any of several well-know types, including a serial interface, a parallel interface, a Universal Serial Bus ("USB") and the like.

Further included in the data processing system 113 may be a communication adapter 134 for connecting the data processing system 113 to a data processing network 142. For user interface purposes, the data processing system 113 may include a display adapter 136 for connecting the bus 112 to a display device 138. In an alternative embodiment, the data processing system 113 may include additional display adapters (not shown) for connecting additional display devices (not shown) to the data processing system 113.

It will be appreciated that, although many data processing systems 113 may have many or all of these elements, each and every element described is not required in order for a device to qualify as a data processing system. One particular type of a data processing system is called a Real Time Unit ("RTU"). An RTU is a data processing system 113 adapted to receiving sensor or other real-time data providing units. Accordingly, the I/O adapter 118 is adapted to receive input from such sensor or data provider. However, the RTU may not have a user interface adapter 122 or any of the elements attached thereto. In some alternative embodiments, the RTU may have a user interface adapter 122, but the associated devices (keyboard 124, mouse 126, etc.) are only connected on a temporary basis, for installation, maintenance and the like. Similarly, the RTU may or may not have a hard disk 120 or tape drive 140 or the like.

Figure 2:
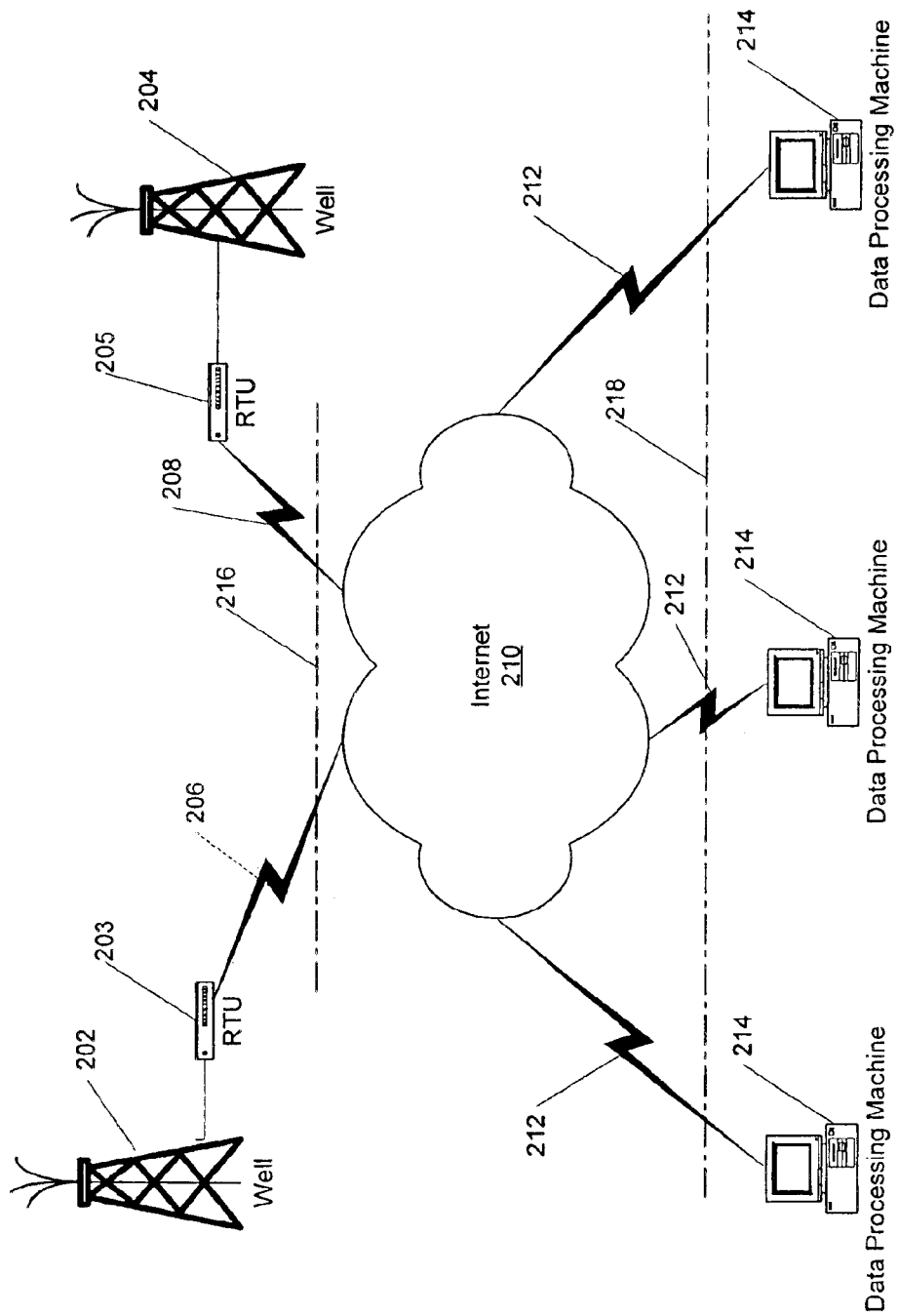
FIG. 2 is a block diagram of the system of the instant invention and its interaction with and use of the Internet and security devices.

The overall character and operation of the instant invention is demonstrated with reference to FIG. 2. FIG. 2 depicts two wells 202, 204. The wells described may be any of the many types of wells, including but not limited to natural gas wells, petroleum wells, water wells and the like. Although derricks are shown to represent each well, those skilled in the art will appreciate in light of this disclosure that the instant invention is not limited to the drilling phase of the life of a well. The instant invention is well-suited to wells in production and wells being re-worked, as well as those currently being drilled.

Each well 202, 204 is equipped with sensors, well known within the art, for the purpose of monitoring the function and operation of the well 202, 204 and providing data. The sensors may monitor characteristics such as wellhead or downhole flows and/or pressures, temperature at various locations on or near the well, formation evaluation, including resistivity, permeability, saturation, vibration, radioactivity or other nuclear activity at various points within the well, and various liquid, gas or solid levels, presence within the well and the like. Sensors may also monitor fluid levels (in tanks or in reservoirs or the like), stress level, images, current, voltage, compositions or acoustics. The sensors used in the instant invention are, for purposes of their detection functions, indistinguishable from those used presently within the art.

Though many different types of sensors use many different types of output, each type of output may be converted to an electrical-type output. For example, a pressure sensor at the wellhead may use a hollow tube to communicate pressure directly to a measuring device. The pressure in the tube may activate a graduated gauge to display the relative pressure. However, in such an instance, the gauge may be replaced by a variable resister that is activated by the pressure, converting the pressure to a relative electrical resistance and thus relative electrical current. That electrical current may then be used to activate an electrical or electronic gauge or display instrument.

In the instant invention, the output from the gauges is converted to electrical or electronic output and interfaced with a RTU 203, 205 data processing system or other bridging device. The RTU 203, 205 may be a data processing system or a portion of a data processing system suitable to receiving the electrical or electronic signal and formatting it for further transmission and described below.

Although the primary function of the RTU 203, 205 is transmission of the data from the wells 202, 204, it will be appreciated by those skilled in the art that an RTU 203, 205 may perform other functions as well. For example, the RTU 203, 205 may perform initial and/or final computations on the data from the wells 202, 204. The RTU 203, 205 may also send commands to the sensors to modify the rate of sensing or the format or quality of the data sent to the RTU 203, 205. The RTU 203, 205 may also be an entire data processing system, fully equipped to perform advanced calculations on the data, such as some of the ones described hereinbelow.

The wells 202, 204 may be remotely located. For example, a first well 202 may be on shore in a remote, undeveloped region, possibly of a foreign country. A second well 204 may be off shore, drilling several miles below the surface of the water. The instant invention accommodates the remote location of the wells used. In fact, in many instances the remote nature of any particular well 202, 204 may enhance the efficiencies seen through the use of the invention.

The RTUs 203, 205 are connected through telecommunication lines 206, 208 to the Internet 210 or other wide area network ("WAN"). The telecommunication lines 206, 208 used may be of any of a number of types well-known within the art, including wired and wireless connections. Advances in direct-connection technology, including advances in the running, splicing and operation of fiber optic cable and the running of other types of data transmission media, have also helped to make data connections available to wells 202, 204. Those skilled in the drilling arts will appreciate that the recent advances in wireless technologies, including broadband satellite transmissions, cellular data connections, Ricochet™ data connections, Data Service Line ("DSL") data connections make the availability of telecommunication lines 206, 208 much greater than they once were. RTUs have specifically been designed with communications interfaces using Supervisory Control And Data Acquisition ("SCADA") and Programmable Logic Controller ("PLC") protocols/languages. Decreased costs and increased availabilities associated with the telecommunication lines 206, 208 make the invention more feasible for remotely-located wells 202, 204.

Either at the RTUs 203, 205 or at some point along the telecommunication lines 206, 208 prior to data reaching the Internet 210, a security device 216 may be employed. The security device 216 may consist of encryption of the data, password access restrictions being placed on the data, firewalls or any of a number of similar conventions well appreciated within the art. These conventions not only protect the data as it travels through the Internet 210 from being viewed or "snooped" upon, but also prevent unauthorized persons from accessing the RTUs 203, 205.

Generally, the communication lines 206, 208 will connect the wells 202, 204 to the Internet 210. The Internet 210 is a set of networked data processing systems which are interconnected for the purpose of providing data transmission from point to point within the network. However, it will also be appreciated that the Internet 210 may be replaced by any successor network or any other WAN. Presently, the availability, flexibility and diversity of the Internet makes it an ideal medium of transmission to which to connect. The main function of the Internet or other WAN in the context of this invention is the facilitation of the transmission of data from the wells 202, 204. Accordingly, any data transport mechanism which accepts data from a telecommunication line 206, 208 and makes that data available to users falls within the scope of the described invention. The provision of the data security elements 216 makes the public nature of the Internet 210 or its successor of much less concern.

The Internet 210 or other WAN may be accessed by one or more service provider data processing machines 214. The user data processing machines 214 connect to the Internet 210 by means of a telecommunication line 212. It will be appreciated that the telecommunication line 212 used to connect a user data processing machine 214 to the Internet 210 is similar to the telecommunication lines 206, 208 used to connect the wells 202, 204 to the Internet 210. In that, the telecommunications lines 212 (or the data processing machines 214 themselves) may be equipped with security measures 218. These security measures 218 may encrypt data (so that only qualified service providers are permitted to view the data) and block certain types of access to the data processing machines 214.

It will also be appreciated that the service providers are frequently much more accessible than are the wells 202, 204. Accordingly, generally a wider variety of telecommunications options present themselves for the telecommunications lines 212 to the service provider data processing machines 214. In the event, however, that a service provider is remotely located, access may be had via any of the above-referenced communications methods, all falling with the scope of the invention.

The invention is configured so that the information collected by the sensors at the wells 202, 204 is posted through the Internet 210 for access or receipt by the service provider data processing machines 214. Accordingly, service provides may collect, view and/or monitor information about the characteristics of the wells 202, 204 without physically being present at the wells 202, 204.

Those skilled in the computer and communications arts will appreciate that the information collected by the sensors at the wells 202, 204 may be provided to the Internet 210 in real-time (or near real-time), may be accumulated for periodic updates or may be stored for later processing or polling through the Internet 210. In any of these embodiments, the data processing machine or bridge device may also act as a buffer or temporary data storage unit in order to accomplish these tasks.

The invention may comprise one or more security measures 216, 218 frequently employed in the Internet context in order to provide security to the data provided by the wells 202, 204. Encryption may be used on the data so that only those with the proper decryption keys have access to the true data. Encryption algorithms such as Rivest-Shamir-Adleman ("RSA") and Data Encryption Standard ("DES") are compatible with the instant system and method and may be used to provide such security to well data. Equally, other crypographic methods may also be employed, all falling within the scope of the instant invention, in order to provide secure access to well data.

In an alternative embodiment, browsers may be employed for access to the data. In such scenarios, Secured Sockets Layer ("SSL") or other browsing security measures may be employed in order to insure that proper passwords or other identifying information are provided to authenticate the dissemination of data.

Figure 3:
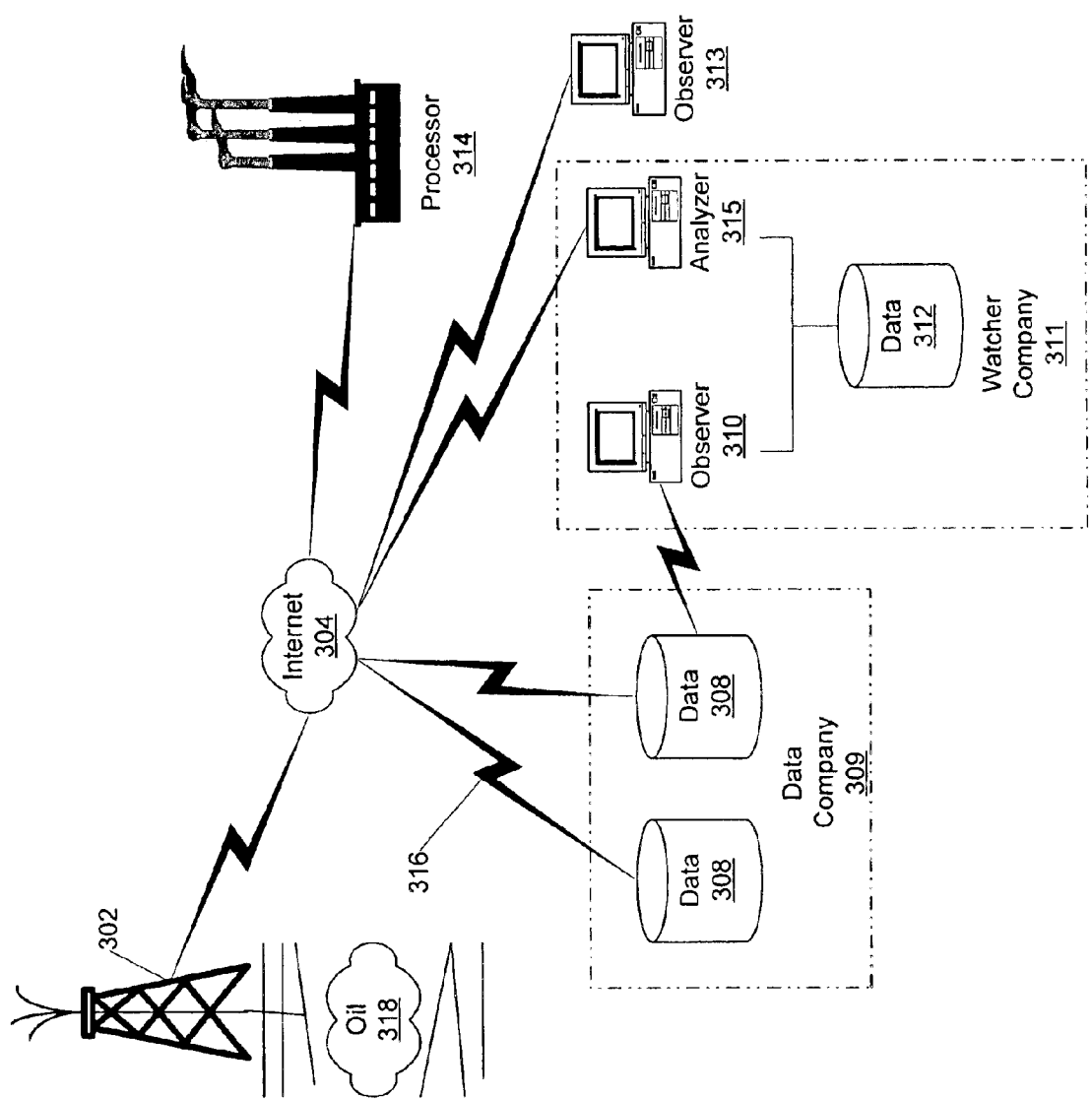
FIG. 3 is a block diagram depicting several service providers who may be employed in conjunction with the instant invention.

A more specific embodiment of the invention, along with additional specificity as to the nature and types of service providers available under the invention, is demonstrated with reference to FIG. 3. FIG. 3 depicts a well 302 having sensors and an RTU (not shown) which are electrically connected to the Internet 304. Data from the well 302 is sent through the Internet 304 to several service providers 309, 310, 311. Additionally, data from the well 302 is sent to a processing facility 314. Those skilled in the art will appreciate that any processing facility 314 may be used within the instant invention, including refineries, purification facilities and the like, all having the same effect as described herein and accordingly falling within the invention.

Many different types of service providers 309, 310, 311 may be utilized in accordance with the instant invention. FIG. 3 demonstrates some of those service providers, but it will be well appreciated that other service providers requiring access to data from the well 302 may likewise be used in accordance with the instant invention. As depicted on FIG. 3, however, one type of service provider may be a data company 309. The data company 309 may maintain one or more database servers 308 comprised of data processing machines configured to data storage. The database servers 308 are connected to the Internet 304 via communications lines 316. The database servers 308 store data from the well 302 for future use. In an alternate embodiment, the data company 309 may also rectify anomalies in the data, or "clean" the data, or perform other tasks in addition to simple data storage. These operations may be performed by the database server 308 itself or by a secondary data processing machine (not shown) operating in conjunction with the database server.

A second type of service provider available under the instant invention is the global observation/evaluation company 311 or independent observer 313. The watcher company 311 may employ one or more observers 310. The function of the observers 310 and the independent observer 313 is to monitor the data from the well 302 in order to detect various conditions at the well and recommend or specify appropriate interventions as necessary. It will be appreciated that the observers 310 and independent observer 313 may receive data directly from the well 302 via the Internet 304 or may use data stored on a database 308 at a data company 309. In either eventuality, the observer 310 or independent observer 313 may create or maintain its own data store 312 of the data it considers pertinent or pay a data company 309 for access. In this way, the most relevant data is kept at hand for the observers 310 to access without using additional bandwidth or incurring additional expense.

Data may also be sent to or accessible by service providers providing processing facilities 314. Processing facilities 314, such as refineries or manufacturers, may use the data from the well 302, particularly data such as flow data and the like, to plan desired processing and storage capacities. The speed of the transmission of data from the well 302 through the Internet 304 to the processing facility 314 will likely far exceed the speed with which drilled product will be transported from the well 302 to the processing facility 314. Accordingly, the system may provide an automatic warning and planning system.

The operation of the present system and some of the methods of doing business involved in the invention are described by way of example in which the well 302 is particularly an oil well producing oil and natural gas 318. The reader will appreciate that, though the example is framed in the context of an oil and gas well, the invention is by no means limited to oil applications. Further, though the example is given in the context of production, the example could just as easily be made for the instances of drilling and post-production by persons skilled in the art, in light of this disclosure.

In the oil and gas context, as in other drilling contexts, those skilled in the drilling arts will appreciate that in drilling one may encounter several levels or layers of different types of earth and rock. While the concept of "stopping when one hits oil" may seem simple in concept, in practice the art of determining when to stop drilling and where to stop and complete the well to produce the optimum amount and type of oil is quite complex. Because wells are essentially drilled blind, only by evaluating a great number of factors (downhole pressures, temperatures, seismic activity, acoustics, cutting contents, etc.) can one determine when it is appropriate to stop drilling and complete the well.

Once completion is accomplished into a sand that is rich in hydrocarbons, production begins. As with the drilling process, the process of producing oil and natural gas presents a variety of dynamic conditions which can be influenced by a variety of interventions. For example, it is common that the silt in the sand holding oil will get pulled to the fracture point in the casing by the oil being produced. That silt may clog the pores in the casing, slowing production. A service company may inject chemicals into the well (such as certain acids, etc.) in order to clear the silt from the fracture point and improve production. Other times, particularly when downhole pressures are low, production may be speeded by the application of an Electric Submersible Pump ("ESP") to pump liquid hydrocarbons to the surface.

Additionally, there are a number of interventions that may be activated remotely. For example, it is possible to control a beam pump at a well 302, regulating the pump's speed and on/off state, over the same Internet 304 connection which provides well 302 data. Remotely-actuated valves and other devices provide similar capabilities to intervene to regulate flow and other characteristics of the well.

Using the instant invention, the experts in the arts of drilling and producing need not be present at the well 302 in order to monitor and control the search for the oil 318. Information relevant to the determination as to what interventions should or should not be taken at the well 302 may be conveyed over the Internet 304 to an observer's 310, 313 data processing machine and employed by a consultant or employee who works many miles away and may monitor various wells. The observer 310, 313, because he need not be physically present at the well 302, may enjoy a greater accessibility to other data sources (geological surveys, maps, soundings and the like) which may assist the observer in making determinations and/or recommendations as to the interventions and other operations of the well 302.

In an alternative embodiment, data may be passed to an analyzer 315, who may simply be a person adept at pattern recognition. With the proper programming of the data processing machine employed by the analyzer 315, the process of the observer 310, 313 identifying patterns in data which might trigger the need for some intervention may be simplified greatly. In fact, the observer may not necessarily even need to know what the interventions are or how they are employed. The observer may not even realize that he is looking at well 302 data, in some embodiments. Programmed to this level of simplicity, the function of the independent observer 313 can be made available to an entirely different segment of the workforce, generally at much lower costs.

In another alternative embodiment, the observer 310, 313 function may be mimicked or performed directly by computer program at the analyzer 315. Advances in artificial intelligence may increase the computer's ability to spot conditions indicating required interventions. Notably, these advances in artificial intelligence and the programming behind any analyzer 315 functions need not be accomplished by the oil company or any service company. These functions may be provided by the watcher companies 311 on the same terms as discussed below.

In an alternative embodiment, the analyzer 315 function will incorporate or constitute direct computations on the data, to yield additional data which may be observed in the manners set forth above. It will be appreciated by those skilled in the art that the data from the well 302 may comprise, specifically, downhole annular fluid measurements, which may then be used to derive real-time rate and pressure data. The data from the well 302 may comprise, specifically, rate and pressure data (or that data may be derived) so that the analyzer 315 function could then in turn derive real-time measurements in the skin of the well 302. The skin may be derived by the analyzer 315 using any number of methods, including a best-fit superposition. The computation of the skin may also involve deconvolving the induced cyclical transient pressure wave caused by external factors on the formation, such as rod pump action. In this way, the analzyer 315 may provide an added value to the data from the well 302. Results may be stored at a watcher 311 or communicated directly to an observer 310, 313.

If professional observers 310, 313 are used, the observer may communicate directly back to the well 302, either electronically, by telephone or via some other real-time communications method, in order to instruct crews as to what actions to take with regard to the drilling process. Such professional observers 310, 313 may also recommend a particular service provider to provide equipment, chemical or services to the well. In the alternative, the observers 310, 313 may notify a service company or other intermediary, depending upon the employment arrangement, in order to facilitate the recommended interventions. These recommendations may be reviewed by other personnel or otherwise verified in order to insure that unnecessary or harmful services are not provided to the well 302.

Simultaneously, the dowstream facilities 314, such as a refinery or gathering system, may be monitoring the drilling process to provide better estimates as to when changes in delivery volumes might occur, so that production capacity can be adjusted at the proper time and in the proper amounts. The processing facility/refinery 314 may make such determinations independently or in conjunction with observer personnel 310, 313 who have similar access to the well 302 data.

Though the present example is provided with reference specifically to an oil well, observers and refineries, it will be readily appreciated that the model is easily adapted to any geological drilling environment, including without limitation water, other hydrocarbons, other gases and liquids and the like.

Figure 4:
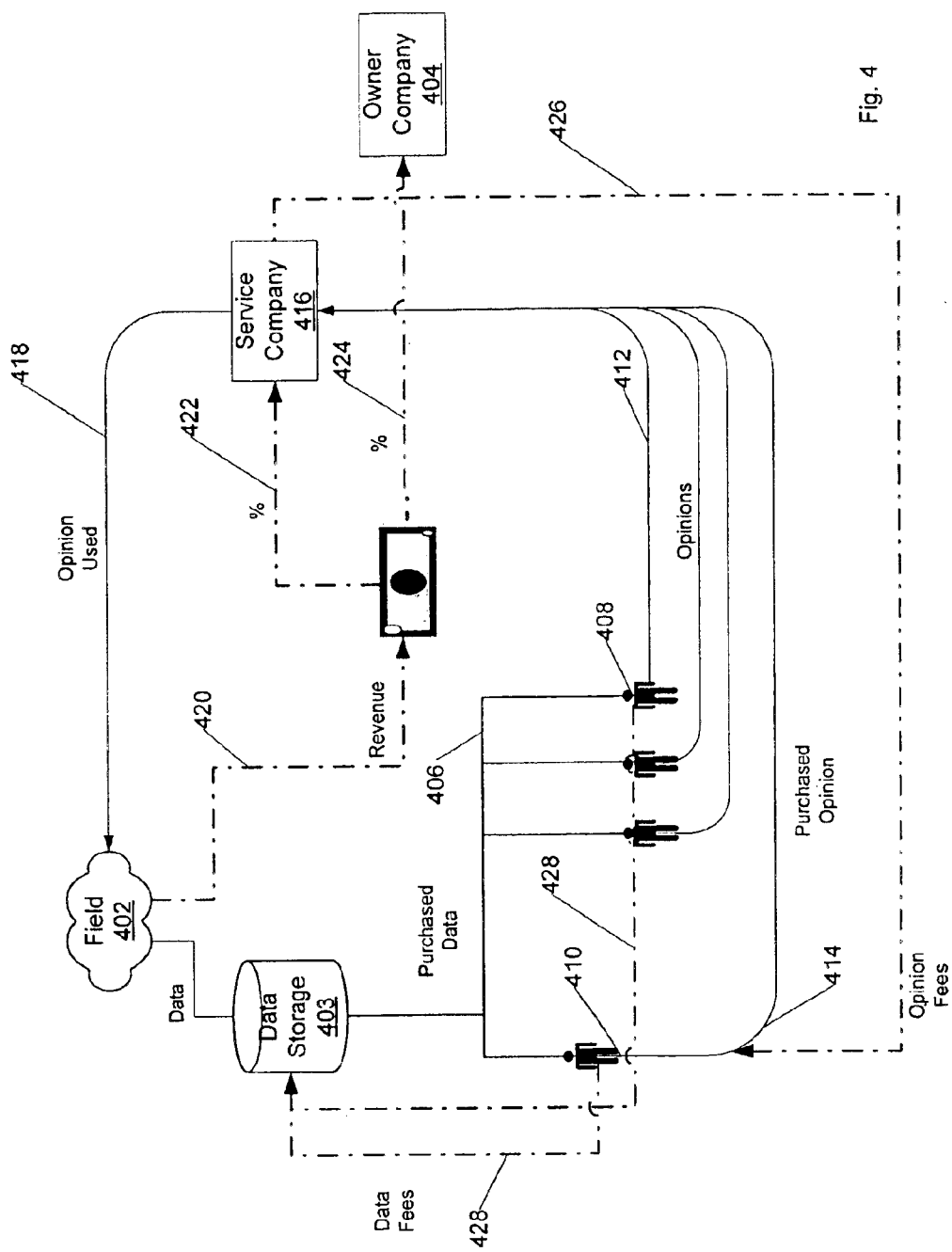
FIG. 4 is a block diagram depicting the operation and a revenue distribution under the instant invention system and method, as well as the business implications of the invention.

The features of the instant invention that permit the service providers, who may be employees or hired on contract, to be remotely located also provides the ability to use a variety of unique business models, which may be incorporated into the invention. These models are described with reference to FIG. 4.

A geological field 402 containing one or more wells is owned and/or operated by an owner company 404, which may be an oil company in the context of an oil field, a water company in the context of a water field, or similar company owning an interest in real estate from which they would like to harvest materials. The owner company 404 may employ one or more service companies 416 to provide services to the wells of the field 402. The owner company 404 or a service company 416 may equip the wells in the field 402 with sensors and telecommunications equipment, as set forth in the foregoing disclosure.

In one embodiment, the services of a data storage service provider 403 are employed to receive the data from the wells on the field 402. That data storage service provider 403 may make that data available 406 for purchase by one or more qualified service providers. Some of those qualified service providers may be observers 408, 410 or other service providers. When the service providers 408, 410 receive the purchased data 406, they in turn pay data service fees 428 back to the data storage service provider 403.

The agreement to pay data service fees 428 may be made on any one of several bases. In one embodiment, the agreement will be a flat fee for access to certain blocks of data for a specified temporal interval. In another embodiment, the data service fees 428 may depend upon the amount of data viewed or accessed. In yet another embodiment, the fee basis may be contingent upon the use of the data or the final results of potential production increases. In yet another embodiment, the data service fees 428 may be paid by the service company 416 or owner company 404 (not shown) on any of the foregoing terms or others which are commercially viable.

As previously noted, the owner company 404 may employ a service company 416 to manage operations at the wells of the field 402. The service company 416 may solicit recommendations from the several observers 408, 410 based upon the data relating to the field 402. The observers 408 may forward several opinions 412 to the service company 416 for consideration. In one embodiment, each observer 408, 410 is paid a retainer fee to provide opinions 412. In an alternate embodiment, an observer 410 may be paid 426 if and only if the opinion 414 he provides to the service company 416 is purchased and used 418. Other alternative embodiments provide for payment combinations combining the retainer and contingent models and other commercially viable considerations.

It would appreciated that the observers 408, 410 may each have different expertices and may, in turn, work for a different problems with any particular well. For example, one observer 410 may be seismologist and may look primarily at seismological data. Another observer 410 may be a petroleum engineer who may observe primarily flow data, viscosity, and the like to detect clogs in a casing fracture. The various observers 408, 410 may work in conjunction with one another. Accordingly, one observer 408 may locate a problem and recommend a certain treatment to a well. That information may be passed to a second observer 410 who examines the specified service and recommends a particular service provider to provide the treatment. In this way, observers 408, 410 may be focused to very narrow functions in order maximize efficiency.

The service company 416 then uses the opinion 418 in operating or drilling the field 402. Hopefully, the use of the opinion 418 yields additional revenues 420 from the field 402.

The agreement between the owner company 404 and the service company 422 may provide for a division of revenue from the field 402. Although many different basis for payment are possible, FIG. 4 demonstrates a percentage 422 paid to the service company with a percentage 424 retained by the owner company.

If the contract or employment agreement entered into between the observer 410 whose advice was used and the service company 416 is a contingent-type contract, then the service company's percentage portion 422 of the revenue 420 from the field 402 may be further split 426 between the service company 416 and the observer 410 whose advice was used. In an alternative embodiment, the revenue 420 used for the computation of the divisions of revenue as to the observer 410 and/or service company 416 may be the incremental increase in revenue experienced at the field 402 at such time as the advice was employed 418.

Additional description of the flow of revenue under certain embodiments of the invention is given with regard to FIG. 5. FIG. 5 depicts the revenues received by the owner company 502 due to the operations of a well. Under the instant model, a portion of those revenues may be paid to the service company 504. Of the portion paid to the service company 504, a portion of that fee may be paid to the observer company 506 for services rendered. Moreover, the observers may pay the data storage facility 508 a portion of what they receive.

As shown, each of the revenues is dependent upon the revenues received by the owner company. Accordingly, if a certain piece of advice from an observer does not create revenue as expected, the owner company is not obligated to pay the same fee as expected. The proportionality which may be present in some payment models of the instant invention may give added benefits to the owner company and raise profitability, particularly when data or advice is unused or unprofitable.

As to the specific manner of operation and use of the present invention, the same is made apparent from the foregoing discussion. However, for the sake of clarity, several key applications of the invention are highlighted. The foregoing invention includes applications for the location of wells qualifying for re-completion, the collection and analyzation of production data, the optimization of production wells, the location of favorable sands within a drilling context, and the like.

With respect to the above description, it is to be realized that although embodiment of specific material, representations, iterations, applications, well configurations, networks, and languages are disclosed, those enabling embodiments are illustrative and the optimum relationship for the parts of the invention may include variations in composition, form, protocols, function, and manner of operation, which are deemed readily apparent to one skilled in the art in view of this disclosure. All relevant relationships to those illustrated in the drawings and the specification are intended to be encompassed by the present invention.

Therefore, the foregoing is considered as merely illustrative of the principles of the invention. Numerous modifications will readily occur to those skilled in the art. It is not desired to limit the invention or the claims to the exact construction and operation shown or described, and all suitable modifications and equivalents may be resorted to, falling within the scope of the invention.

What is claimed is:

1. A system for dissemination of data regarding a well comprising:
   a sensor associated with at least one well;
   a Real Time Unit (RTU) comprising an RTU CPU, an RTU I/O adaptor and an RTU communications adaptor;
   an RTU telecommunication medium in data communication between the RTU and a wide area network; and
   a service provider having a service provider data processor,
   wherein the wide area network is in data communication with the service provider data processor,
   wherein the RTU is electrically connected to the sensor through the RTU I/O adaptor,
   wherein the RTU CPU is in data communication with the RTU I/O adaptor and the RTU communications adaptor, and
   wherein the RTU is in data communication with the RTU telecommunication medium through the RTU communications adaptor.

2. The system of claim 1 wherein the RTU telecommunication medium is selected from a group consisting essentially of a wired connection, a cellular connection, a non-radio frequency wireless connection, a Ricochet connection, a satellite connection, a high-frequency connection, an optical connection, and a Code Division Multiple Access (CDMA) connection.

3. The system of claim 2 wherein the wide area network is the Internet.

4. The system of claim 2 wherein the RTU is configured so as to perform a calculation upon data received through the RTU I/O adaptor.

5. The system of claim 2 wherein the RTU is configured so as to send a command to the sensor.

6. The system of claim 2 wherein the sensor is selected from a group consisting essentially of a permeability sensor, a saturation sensor, a flow rate sensor, a radioactivity sensor, a temperature sensor, an image sensor, a fluid level sensor, a stress sensor, a current sensor, a voltage sensor, a compositional sensor, an acoustic sensor and a pressure sensor.

7. The system of claim 5 wherein the sensor further comprises a second sensor selected from a group consisting essentially of a permeability sensor, a saturation sensor, a flow rate sensor, a radioactivity sensor, a temperature sensor, an image sensor, a fluid level sensor, a stress sensor, a current sensor, a voltage sensor, a compositional sensor, an acoustic sensor and a pressure sensor.

8. The system of claim 2 wherein the sensor is comprised of a rate sensor and a pressure sensor.

9. The system of claim 5 wherein the service provider data processor comprises a first data viewer comprising:
   a first viewer CPU;
   a first viewer communications adaptor; and
   a first viewer display,
   wherein the first viewer communications adaptor is in data communication with the wide area network,
   wherein the first viewer CPU is in data communication with the first viewer communications adaptor and the first viewer display,
   wherein the first viewer display presents the data regarding the well to a service provider to assist in the evaluation of the data regarding the well.

10. The system of claim 9 wherein the RTU is configured so as to send a command to the sensor.

11. The system of claim 9 wherein the first data viewer is configured so as to assist the service provider in evaluation of the data regarding the well to determine a skin of the well.

12. The system of claim 9 wherein the first data viewer is configured so as to communicate service offerings from the service provider to an operator of the well.

13. The system of claim 5 wherein the service provider data processor comprises a first database server comprising:
   a first database server CPU;
   a first database server disk unit; and
   a first database server communications adaptor,
   wherein the first database server communications adaptor is in data communication with the wide area network,
   wherein the first database server CPU is in data communications with the first database server communications adaptor and the first database server disk unit, and
   wherein the first database server disk unit stores the data regarding the well.

14. The system of claim 13 wherein the first database server is further configured to accept payment for access to the data regarding the well.

15. The system of claim 13 wherein the service provider data processor further comprises a second database server configured similar to the first database server,
   wherein the first database server and the second database server are in data communication with one another.

16. The system of claim 13 wherein the first database server further comprises a second disk unit,
   wherein the second disk unit is in data communications with the first database server CPU, and
   wherein the first database server stores the data regarding the well on the first database disk unit and the second disk unit.

17. The system of claim 5 wherein the service provider data processor comprises a first analysis server comprising:
   a first analysis server CPU; and
   a first analysis server communications adaptor,
   wherein the first analysis server communications adaptor is in data communication with the wide area network,
   wherein the first analysis server CPU is in data communications with the first analysis server communications adaptor, and
   wherein the first analysis server analyzes the data regarding the well.

18. A method of analyzing well characteristics comprising the steps of:
   placing a sensor at a well in data communication with a wide area network;
   placing a Real Time Unit (RTU) in proximity to the well and in data communication with the sensor;
   detecting a characteristic of the well through the sensor;
   establishing a data connection between an analyzing machine and the wide area network;
   downloading data representing the characteristic to the analyzing machine through the wide area network; and
   evaluating the data to determine the presence of a condition at the well including comparing the data to reference values for the well characteristic represented.

19. The method of claim 18 further comprising the step of charging a fee for access to the results of the evaluation.

20. The method of claim 18 further comprising the step of offering a service upon the well based upon results of evaluating the data.

21. The method of claim 18 wherein the wide area network is the Internet.

22. The method of claim 18 wherein
   the sensor comprises a flow sensor and a pressure sensor; and
   the condition is a skin of the well.

23. The method of claim 18 wherein the step of evaluating the data further comprises adjusting the data to compensate for an external factor.

24. The method of claim 18 wherein the step of evaluating the data is performed by comparing a graphical representation of the data to graphical representations of reference values for the well characteristic represented.

25. The method of claim 18 further comprising the steps of:
   establishing a data connection between a multitude of analyzing machines and the wide area network;
   downloading data representing the characteristic to each of the multitude of analyzing machines through the wide area network; and
   evaluating the data at the multitude of analyzing machines to determine the presence of a condition at the well.

26. A method of analyzing well characteristics comprising the steps of:
   placing a sensor at a well in data communication with a wide area network;
   placing a Real Time Unit (RTU) in proximity to the well and in data communication with the sensor;
   detecting a characteristic of the well through the sensor;
   establishing a data connection between an analyzing machine and the wide area network;
   downloading data representing the characteristic to the analyzing machine through the wide area network; and
   evaluating the data to determine the presence of a condition at the well including
      locating rate data for the well during a certain time period;
      locating pressure data for the well during the certain time period; and
      computing a skin measurement for the well during the certain time period.

27. A method of analyzing well characteristics comprising the steps of:
   placing a sensor at a well in data communication with a wide area network wherein the data comprises continuous downhole annular fluid pressure data;
   placing a Real Time Unit (RTU) in proximity to the well and in data communication with the sensor;
   detecting a characteristic of the well through the sensor;
   establishing a data connection between an analyzing machine and the wide area network;
   downloading data representing the characteristic to the analyzing machine through the wide area network; and
   evaluating the data to determine the presence of a condition at the well,
   wherein the step of evaluating the data comprises the steps of:
      accessing the continuous downhole annular fluid pressure data for the well;
      deriving a rate measurement for the well from the continuous downhole annular fluid pressure; and
      deriving a pressure measurement for the well from the continuous downhole annular fluid pressure.

28. The method of claim 27 wherein the steps of deriving the pressure measurement and deriving the rate measurement are performed in real-time.

29. An apparatus for providing access to well data comprising:
- a first viewing machine having a CPU, a communications adaptor, a display, and an input facility;
- a wide area network; and
- a communication link between the communications adaptor of the first viewing machine and the wide area network,
- wherein the first viewing machine is adapted to downloading well data from the wide area network,
- wherein the first viewing machine is further adapted to comparing the well data to a set of reference data, and
- wherein the first viewing machine is further adapted to receive evaluation input via the input facility.

30. The apparatus of claim 29 wherein the first viewing machine receives the well data from a well sensor.

31. The apparatus of claim 29 wherein the first viewing machine receives the well data from a database server.

32. The apparatus of claim 29 wherein the first viewing machine is adapted to present the well data in graphical form on the display, and
- wherein the first viewing machine is further adapted to present the set of reference data in a graphical form on the display.

\* \* \* \* \*